United States Patent [19]

Swanson

[11] 4,078,917
[45] Mar. 14, 1978

[54] EXTRACTION OF ANTIMONY TRIOXIDE FROM ANTIMONY SULFIDE ORE

[76] Inventor: Rollan Swanson, The Baker House, 220 California Ave., Santa Monica, Calif. 95405

[21] Appl. No.: 652,093

[22] Filed: Jan. 26, 1976

[51] Int. Cl.$^2$ ............................................. C22B 30/02
[52] U.S. Cl. .................................. 75/101 R; 75/108; 75/121; 423/87; 423/617
[58] Field of Search ...................... 75/101 R, 121, 108; 423/87, 617

[56] References Cited

U.S. PATENT DOCUMENTS

| | | | |
|---|---|---|---|
| 796,849 | 8/1905 | MacArthur | 75/121 X |
| 975,148 | 11/1910 | Masson | 75/121 |
| 1,548,854 | 8/1925 | Schleicher | 423/87 X |
| 1,646,734 | 10/1927 | Marden | 75/121 X |
| 3,723,267 | 3/1973 | Baiborodov et al. | 75/121 X |
| 3,883,345 | 5/1975 | Caldon et al. | 423/87 X |

*Primary Examiner*—G. Ozaki
*Attorney, Agent, or Firm*—Albert F. Kronman

[57] ABSTRACT

Disclosed is a process for extracting antimony trioxide from antimony sulfide ore concentrate by solubility differential of the trioxide in lower alkanol solutions of sodium or potassium hydroxide and wherein the total amount of water contained in the concentrate, the alkanol and the hydroxide is not more than 26.52 volume percent of the antimony sulfide content; which process includes treating the ore in the absence of substantial amounts of air with an alkanol solution containing an excess of sodium or potassium hydroxide, basis $Sb_2S_3$ content in the ore; separating also, in the absence of substantial amounts of air, insoluble concentrate material from a filtrate composed of water, alkanol, hydroxide and sulfide of potassium or sodium, antimony trioxide trihydrate, sodium or potassium dihydro pyroantimonite; repeatedly extracting the insoluble material with the filtrate also in the absence of substantial amounts of air; allowing the filtrate to settle so as to form a precipitate of antimony trioxide and sodium or potassium dihydro pyroantimonite; separating the precipitate from the filtrate; dehydrating the precipitate to leave behind a mixture of antimony trioxide and hydroxide of sodium or potassium; and adding the separated alkanol to the mixture to dissolve the hydroxide and leave behind antimony trioxide.

13 Claims, No Drawings

EXTRACTION OF ANTIMONY TRIOXIDE FROM ANTIMONY SULFIDE ORE

BACKGROUND OF THE INVENTION

This invention relates to a novel process for recovering antimony trioxide from antimony sulfide ores and concentrates.

The main object of this invention is to reduce the air, water, thermal and chemical pollution inherent in present processes of making antimony trioxide.

No heat or pressure is used in the disclosed process itself and any reduced pressure or heat is used only in recycling of the alcohol and sodium or potassium hydroxide reagents.

The process is remarkably efficient in recovering antimony trioxide from antimony sulfide concentrates.

By excluding atmospheric oxygen and by the use of closed and preferably full containers and filters and with the removal of excess sulfur through decomposition of the antimony pentasulfide at temperatures above 75° C, it is possible to maintain antimony in a tri-valent state of oxidation wherein no thio-antimonates are formed. Antimony, in this tri-valent state, forms little thio-antimonites, which tend to decompose to antimony tri-sulfide.

Use of the solubility differential between antimony trioxide and antimony tri-sulfide in various alcohol solutions, coupled with the addition of sodium or potassium hydroxide to the alcohol solution, coupled with the inability of antimony to form a hydroxide produces an unpredictable reaction wherein antimony trioxide is the end product.

Antimony trioxide finds utility in the manufacture of tartar emetic; as a paint pigment; in enamels and glasses; as a mordant; and in flame proofing.

The reaction of the process according to the present invention is as follows:

$Sb_2S_3$ + 6 KOH or 6 NaOH in an ethanol, methanol or other alcohol solution, (wherein the concentration is approximately 16.66% solution of KOH, or 8% solution of NaOH) = 3 $K_2S$ or 3 $Na_2S$ + $Sb_2O_3.3H_2O$. The sodium sulfide (mono) is only slightly soluble in ethanol or mehanol whereas the potassium sulfide is much more soluble.

In addition to the water of hydration formed during the initial reaction, water is found as an impurity in the antimony sulfide concentrate in the sodium or potassium reagents and in the alcohol reagents, 15.92% of the weight of $Sb_2S_3$ in the concentrate will be water. The upper limit of the water content is 26.52%. In the presence of this quantity of water, the following reactions occur:

2 $H_3SbO_3$ (antimonous acid — a representation of trihydrated antimony trioxide) + 2 NaOH or 2 KOH + 2 $H_2O$ = $Na_2$(or $K_2$) $H_2Sb_2O_5.5H_2O$. This is the sodium or potassium dihydro pyro-antimonite. Various other derivations of a compound of the same empirical formula exist through the sodium or potassium hydroxyantimonite and sodium or potassium meta-antimonite.

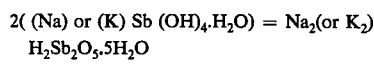

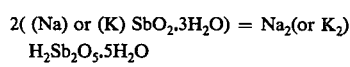

After mixing the antimony sulfide concentrate and the alcohol solution of sodium or potassium hydroxide and with an agitation supplied from 1 to 3 minutes at temperatures not exceeding 65° F the mixture is filtered. It is best to use full closed containers for the mixing and the filtration should be with limited access to atmospheric oxygen. This is to prevent any oxidation of antimony from the tri-valent state to the pentavalent state of oxidation. Filtration should be accompanied by agitation of the material to prevent caking on the sides and thus trapping some of the white precipitate material in the solid residues.

Some of the finely divided white precipitate of antimony trioxide or antimony-potassium - oxygen hydrated compounds will pass a No. 4, 1 or 2 filter paper. The bulk of the formation of these white precipitates occurs in the filtrate after it has passed the filter paper. This is due to the fact that sodium or potassium meta-antimonite is unstable in water and the remainder is due to the pairing of sodium or potassium hydroxy antimonite molecules when sufficient water is available for their hydration to permit the formation of the compound empirically written as sodium or potassium di-hydro pyro-antimonite. This compound is quite insoluble as the sodium compound and more soluble as the potassium compound, and seems to be the principal precipitate formed in the filtrate. The amount of water necessary to form this compound is an additional 66.66% of the total amount of water formed in the initial reaction.

The total time for precipitation from the filtrate is up to four hours. This time can be reduced by the addition of sufficient water to permit the required degree of hydration to occur. The ratios are:

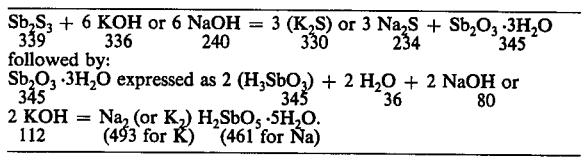

The total amount of water required as 90 parts of water with the varius ratios to the other ingredients of the mixture (54 of the 90 is produced in the initial reaction).

There is also the hydrolysis of the potassium sulfides and sodium sulfides produced in the reaction:

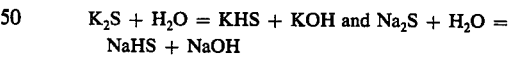

Hydrolysis of the sodium or potassium sulfides occurs because the ratio of 6 KOH or 6NaOH is sufficient with 1 mole of $Sb_2S_3$ to complete the reaction all the way to the sodium or potassium di-hydro pyro-antimonite--if there were no hydrolysis the number of sodium and potassium hydroxides in the equation would be 8. With sodium, the insolubility of the mono-sulfide in the alcohols requires a greater than 6 ratio, preferably 8. Potassium did not require a greater ratio than 6.

When formed 3 – 5 minutes have elapsed, the filtrate with the white precipitate forming in it can be centrifuged and the solids removed. The clear filtrate is then added to the residues in the filter paper and additional extractions can be made which will continue to precipitate in the filtrate after passing the filter paper. An extraction of 97% of the antimony can be made by recycling the proper amount of filtrate a fifth time. As little exposure to atmospheric oxygen as possible should be allowed in both the mixing the filtering and the re-addition of the clarified filtrate to the solid residues.

When the re-use of the clarified filtrate is ended, the solids are removed from the filtrate—as much as 4 hours may be required to completely precipitate the white substances. If the procedures are properly carried out there are no yellow formations on the filter paper from formation of thio-stibnates nor are there any red-yellow-brown residues from the decomposition of sodium or potassium thio-stibnite into antimony tri-sulfide. When the white precipitate is removed, either reduced pressure or application of heat can be used to distill the alcohol from the water solution of sodium or potassium hydroxide (the excess), the sodium or potassium sulfides and their hydrolyzed products formed in the reaction, and the arsenic sulfides and oxides (both of which are soluble in ethanol-methanol). The methanol can be distilled at 15° C under 73mm of Hg pressure. The reduced pressure and applied heat should be such that the alcohol will distill but leave the water behind.

With the removal of the alcohol, the arsenic can be precipitated with a water soluble calcium salt as an insoluble calcium thioarsenite, or calcium arsenite.

The remaining water solution will contain mainly sodium or potassium hydroxide and sodium or potassium hydro-sulfide or polysulfides. The potassium compound is readily decomposed into hydrogen sulfide gas at or near the boiling point of water. The sodium equivalent requires steam at 140° C to reach the same rate of decomposition.

The produced hydrogen sulfide can be burned to produce some or all of the energy required in the process. The burning of hydrogen sulfide in a limited supply of oxygen results in the formation of water and elemental sulfur.

The hydrogen sulfide can be decomposed into elemental hydrogen and sulfur at temperatures beginning at 310° C. This hydrogen can then be used to replace antimony from antimony compounds which are water soluble thereby recovering elemental antimony.

The white precipitate is dried and dehydrated thermally. The temperatures employed are up to 235° C. When the water has been driven off sodium or potassium hydroxide remains with antimony tri-oxide. Addition of the re-cycled and distilled ethanol or methanol to the dehydrated compound will allow the sodium or potassium to re-enter solution for use in treating additional antimony sulfide concentrate and leave the insoluble antimony tri-oxide as the product.

Antimony pentasulfide is not a naturally occurring substance. If it is present in the concentrate, heating the concentrate to 75° C or higher, will reduce this pentasulfide to the tri-sulfide and elemental sulfur. It is necessary to remove this sulfur by gravity or other means (such as carbon disulfide) as either this excess free sulfur or the pentasulfide can react with the sodium or potassium sulfides produced in the reaction and form undesirable sodium or potassium thio-antimonates.

Before addition of water to the process, the total water content of the concentrate, the sodium or potassium reagents and of the alcohol should be considered. Generally, there is sufficient water available from these sources for the process. The amount of water should not exceed 10.61% of the weight of the $Sb_2S_3$ of the concentrate.

The following examples illustrate but do not limit the invention. All the parts given are by weight unless volumes are specified.

EXAMPLE I 100 grams of potassium hydroxide was dissolved in sufficient methanol to make a total volume of 300cc or 33.3%. The solution was allowed to cool to 50° F before using. The solution was made in a stoppered 500cc flask.

The antimony sulfide concentrate contained 60% antimony or 83.7% antimony sulfide. The potassium hydroxide was 90% pure. After these corrections for antimony tri-sulfide content of the concentrate and the corrections for purity for the potassium hydroxide at a ratio of 1 $Sb_2S_3$ to 6 KOH, the figures are 100 grams of KOH and 109.5 grams of 60% antimony content concentrate. The concentrate was heated to 229° C for 1 hour. Instead of a gravity separation or a solvent for the sulfur produced in the decomposition of the antimony pentasulfide present, the excess sulfur was burned off as sulfur dioxide. This sulfur dioxide was reacted with hydrogen sulfide gas and approximately ½ gram of sulfur was recovered.

When both the concentrate and the methanol solution of KOH were at 50° F, they were mixed in the 500cc flask. The flask was kept stoppered during the three minute shaking of the flask. The contents of the flask were poured into a large six inch funnel mounted in a rubber stopper into another 500cc flask. The funnel surface was covered with poly-ethylene wrap to exclude oxygen. The flask holding the funnel was swirled to keep the solids from caking the sides of the No. 4 filter paper.

The filtrate was largely clear at first and then the white precipitate began to form. When about one-half the contents of the filter paper had filtered through (3 minutes in time), the filtrate was removed from the flask and centrifuged in stoppered tubes. The solids were retained and the mostly clear filtrate was added to the filter paper solid residues along with the portion of the liquids that had not yet passed the filter paper. This procedure (adding the filtrate back to the filter paper residues) was repeated five times. The contents of the filter paper were allowed to completely pass as filtrate into the collecting flask. Little discoloration of the filter paper occurred.

Calcium chloride (2 grams) was added to the filtrate after the filtrate had been allowed to stand for 4 hours and the white precipitate removed by centrifuging. The arsenic content was so low in this concentrate that no visible precipitate was formed. The methanol was distilled off at 70° C under 26mm of Hg pressure leaving a red-yellow and yellow brown solid. This solid corresponded according to melting points to potassium sulfide and potassium di-sulfide. After checking melting points (470° C) this substance was added to water and the water boiled. The hydrogen sulfide that formed was led by the vapor pressure of the boiling solution into a flask of KOH. The solution was boiled for 1 hour and no further odor of hydrogen sulfide was noted. Zinc sulfate solution was titrated with the hydrogen sulfide dissolved in the KOH solution. 15.84 grams of sulfur were calculated to have precipitated as zinc sulfide. This corresponded to 58.43% of the sulfur present in the original 109.5 grams sample of antimony sulfide concentrate (before the break-down of the pentasulfide and the removal of this sulfur by thermal means). The recovery of antimony was at 36.6 grams corresponding to a 61% recovery of a 60% antimony content of the concentrate. The white precipitate was dried and then heated to 200° C to drive off the water of hydration. The antimony content of the final oxide after the removal of the reconstituted potassium hydroxide by the distilled methanol was 83.2% of the total solid residues. No sulfur could be found by analysis in this residue. This product therefore corresponded to over 99% pure $Sb_2O_3$. An excess of potassium hydroxide in a more dilute form was used in Example 2. 150 grams of potassium hydroxide were made up to 600 cc in an Erlenmeyer flask which was stoppered. The solution strength in Example 1 was 33.3% and in this example was 25%. Methanol was the solvent.

The same quantity of the same 60% antimony content concentrate (109.5 grams) was treated with the potassium hydroxide in methanol solution when the temperature was 50° F.

EXAMPLE 2

Was not heated to over 75° C to remove and decompose the antimony pentasulfide present in the concentrate. The antimony sulfide concentrate was added to the KOH methanol solution and shaken for 3 minutes. The contents of the flask were then added to a funnel containing a filter paper and above the filter paper was placed a watch glass. The time lost in removing the polyethylene wrap probably allowed more exposure to oxygen than did the use of the watch glass. The funnel was placed in the stopper of another 1000 cc flask. This flask had a bottom outlet fitted with tubing and a clamp. When the filtrate reached 200cc, the filtrate was drained off through the bottom outlet into stoppered centrifuge tubes. Centrifuging removed the white precipitate which had already formed in the first 3 minutes of filtration. The clear filtrate was readded to the funnel filter paper solids. The filter paper solids remained a darker color than did those of Example 1. By not pre-heating the concentrate some light yellow staining appeared at the top of the filter paper indicating the formation of potassium thio-antimonate. The residues were treated with the clear filtrate five times.

In this Example, the end product contained 83% of the antimony present in the 109.5 grams sample and the purity was 99+ % antimony tri-oxide, i.e., of the 65.7 grams of antimony in the original 109.5 gram sample 54.53 grams were recovered. The end product contained no sulfur that could be detected (0.1% is the limit of detection). The end product after methanol extraction of the de-hydrated antimony-potassium-oxygen compound gave a percentage of over 83% antimony.

EXAMPLE 3

A raw ore (not a concentrate) containing 41% antimony as antimony sulfide was treated with a more dilute solution of potassium hydroxide in methanol. 50 grams of potassium hydroxide was made up to 300cc total volume with methanol. This ore contained mostly a silicate base and 2.6% arsenic.

This ore was pulverized to — 90 mesh. The 50 grams of ore contained 20.5 grams of antimony and 8.1 grams of sulfur in the antimony tri-sulfide. The total weight of antimony tri-sulfide was 28.6 grams. The potassium-methanol extraction of this ore gave a 93% recovery of the antimony in five washes with the clear filtrate after the precipitated white solids removed. Nineteen grams of antimony were recovered in a substance (the dehydrated white precipitate after using methanol to dissolve the potassium hydroxide) and the percentage of antimony in the oxide was over 83%, indicating that antimony tri-oxide had been formed.

EXAMPLE 4

The above experiment was repeated with 50 grams of KOH made up to 500cc of methanol and used to treat 35 grams of 60% antimony content antimony sulfide concentrate. With five washes of the filter solids with the filtrate after removal of the white precipitate, a 97% recovery of the antimony was achieved with a antimony content of the final oxide of over 83%. The material was left in the closed bottle with the potassium hydroxide excess and the potassium sulfide that had formed for 3 weeks and did not react to discolor the white precipitate.

EXAMPLE 5

Twenty grams of sodium hydroxide were made up to 250cc ethanol with heat. When the solution had cooled to 50° F it was mixed with 34 grams of 60% antimony content (antimony sulfide) in a 500cc stoppered flask. After 3 minutes, the solution was filtered. (Less care for the exclusion of oxygen was made with the sodium. No watch glass cover, etc., were used.) As the white precipitate formed in the filtrate, it was removed and the clear filtrate added to the filter paper with its solid residues and liquids which had not yet passed the filter paper. An additional 20 grams of sodium hydroxide in 250 cc of ethanol was added to this filter paper and used along with the re-cycled clear filtrate. This gave a product (white precipitate which took longer to form) containing over 83% antimony. The recovery was approximately 95 to 96% of antimony recovered from that in the original sample. This sodium product was allowed to stand eight days in an unstoppered bottle and the clear portion of the filtrate turned yellowish but the solids remained white.

Alkanol Solubility Considerations and Reuse

Potassium hydroxide when made up as a saturated solution in water is immiscible with ethanol.

Potassium hydroxide when made up as a saturated solution in water is miscible with methanol.

Sodium hydroxide when made up as a saturated solution in water is miscible with both ethanol and methanol.

Potassium sulfides and polysulfides can be extracted from an ethanol solution by adding drops of water to the ethanol solution. The ethanol solution will become colorless, while the small amount of water dropped through the ethanol solution will become reddish and will remain immiscible with the ethanol. An excess of water will cause the water and the ethanol to mix and separation is no longer possible. Methanol does not separate into two layers.

Ethanol is the preferred alkanol because it is not necessary to distill it from solution by proceeding as follows: The potassium sulfides and polysulfides are removed by the small amount of water added (drop by drop) to the ethanol solution. This addition of water is made after the original filtration. It is in the filtrate that the bulk of the potassium meta-antimonite, potassium hydroxy antimonite and potassium di-hydro pyroantimonite is formed. This material is removed in a second filtering or by centrifuging. After this, the water can be added to remove the potassium sulfide or polysulfides in an immiscible (with ethanol) water solution. This water solution is heavier than the ethanol solutions and will collect at the bottom of the vessel and can be withdrawn. This solution becomes colored as the ethanol loses whatever coloration it has and an easy visual separation is possible. When at the next step a soluble salt of calcium or some other metal (to form insoluble arsenites) is used to precipitate the ethanol soluble arsenic oxides or any unreacted sulfides; the ethanol is ready for reuse in the process.

The potassium sulfides and polysulfides extracted in the immiscible water layer are readily decomposed into hydrogen sulfide gas and potassium hydroxide from a water solution at 100° C. The hydrogen sulfide can be burned in limited oxygen and may produce elemental sulfur and water and sufficient energy for the entire process.

The potassium hydroxide is much more soluble in ethanol than is sodium hydroxide. An ethanol solution containing 14.28% potassium hydroxide can be used. The practical limits of the sodium hydroxide solution in ethanol is about 8%.

To clean a used ethanol solution of $K_2S$ and KOH, pure water is added in very small quantities. The differential solubility between a water solution of potassium sulfides and an ethanol solution of potassium sulfides is such that the potassium sulfides will pass from the ethanol solution into the water solution. When sufficient ions are present in the ethanol solution of potassium hydroxide (a concentrated ethanol solution at nearly the saturation point) these ions (soluble in both ethanol and water) will tend to push the potassium sulfide ions into the water, due to the much greater solubility in water than in ethanol of the potassium sulfide. The ethanol solution is not completely cleaned of the potassium sulfide but the potassium sulfide content is greatly reduced. When water is saturated with either potassium sulfide or with potassium hydroxide it will not mix with ethanol. When very little water is added to the ethanol solution (containing potassium hydroxide to react with the antimony tri-sulfide) and also containing the potassium sulfide formed in the reaction with the antimony tri-sulfide, the greater water solubility of potassium sulfide will permit it to pass into the water from the ethanol.

If sufficient water is added so that the ethanol and water solutions mix, the separation is ruined and cannot be reconstituted. The reasons for this is molecular particle size. When 100cc of ethanol and 100cc of water are mixed the resulting quantity is 170cc not 200cc. The molecules are interspersed in these miscible liquids. Potassium being a large ion, its density is the least of any metal except lithium. The potassium ion when (as a sulfide or a hydroxide) dissolved in water to a point of saturation will align the water dipoles in an even larger configuration. The potassium sulfide or hydroxide ions so arrayed with the water dipoles have such a size that molecules of ethanol cannot intersperse between (saturated) KOH or $K_2S$ ions arrayed with the dipoles. Sodium is smaller and ethanol can enter even a saturated NaOH - water solution and therefore the solutions are miscible. Smaller alcohol molecules (methanol) can intersperse the KOH or $K_2S$ saturated water solution and the solutions become miscible. For this reason, the larger alcohols butanol, propanol, etc., probably could even prevent miscibility with both potassium and sodium compounds.

In the present process, the cleaning of the ethanol solution reversed the process, by having the ethanol contain both the KOH and $K_2S$. A very small quantity of water will pick up the K ions and mainly the S ions which will form a saturated water solution from the acquisition of these ions from the ethanol. In this saturated form the water is immiscible with ethanol. This gives a cleaning to the ethanol by removing most of the K sulfides. If the solution (water) is less than saturated the two solutions mix and cannot again be separated. It is much easier to drop a little water through the ethanol than to boil all the ethanol to dryness to recover the K sulfides. To insure the immiscibility of two liquids when potassium hydroxide is used dissolved in ethanol, propanol or butanol, the potassium sulfide formed in the reaction with antimony sulfide preferably is removed with a saturated water solution of potassium hydroxide. A saturated KOH solution is immiscible with ethanol. The potassium sulfide will dissolve in the water solution of KOH, and some KOH is displaced and forms new reagent when it is displaced into the ethanol. The removal of the potassium sulfide from the ethanol solution will be at the same rate that the saturated water solution of KOH releases KOH into the ethanol. The presence of saturated KOH decreases the posibilities of the water solution of KOH and $K_2S$ becoming miscible with the ethanol solution of KOH.

This is effective in the case of potassium hydroxide (not sodium hydroxide) in ethanol (not in methanol) and two immiscible layers are formed (water and ethanol).

For over 2% antimony sulfide content concentrates a 5 to 50% addition of carbon disulfide to the alkanol solution of sodium or potassium hydroxide will greatly increase the solubility of antimony sulfide in this carbon-disulfide-alkanol-sodium or potassium hydroxide solution.

The antimony sulfides are very much more soluble in $CS_2$ than in alkanols. $CS_2$ is miscible with the alkanols. The solution of the sodium or potassium hydroxides in the alkanols is mixed with $CS_2$ in proportions of from 5% $CS_2$: 95% alkanol solution to 50% $CS_2$ alkanol solution. This ratio is by volume.

What is claimed is:

1. A process for extracting antimony trioxide from an antimony ore concentrate by the solubility differential of said trioxide in lower alkanol solutions of potassium or sodium hydroxide and wherein said concentrate, alkanol and hydroxide contain a total of no more than 10.61 volumes percent of water, comprising treating said ore in the absence of substantial amounts of air with a lower alkanol solution containing an excess of said hydroxide, to dissolve the $Sb_2S_3$ content of said ore; separating, also in the absence of substantial amounts of air, insoluble material from a filtrate containing water, alkanol, hydroxide and sulfide of potassium or sodium, $Sb_2O_3.3H_2O$, sodium or potassium dihydropyro antimonite; repeatedly extracting said material with said filtrate also in the absence of substantial amounts of air; allowing the filtrate to stand following said extractions to form a precipitate containing $Sb_2O_3$, and said antimonite and a supernatant filtrate composed of alkanol and of the hydroxide and hydrosulfide of sodium or potassium; separating said precipitate, dehydrating said precipitate at a temperature sufficient to remove water to yield a solid containing antimony trioxide and said hydroxide of sodium or potassium treating said solid with the previously separated alkanol to dissolve said hydroxide and form a reusable alkanol solution thereof and leave behind said antimony trioxide.

2. The process of claim 1, wherein said alkanol is methanol, ethanol, butanol, propanol or pentanol.

3. The process of claim 1, wherein said ore contains also arsenic and said water solution is treated with a calcium salt to precipitate calcium thioarsenite and arsenite therefrom.

4. The process of claim 1, further including the step of heating said water solution to a temperature sufficient to form hydrogen sulfide gas.

5. The process of claim 4, further including the step of burning said hydrogen sulfide in a limited supply of oxygen to product at least some of the energy required by the process.

6. The process of claim 4, wherein said hydrogen sulfide is heated to above 310° C. to form hydrogen and elemental sulfur.

7. The process of claim 6, wherein said hydrogen is reacted with water soluble antimony compounds to form antimony.

8. The process of claim 1, wherein said ore contains also antimony pentasulfide and further including the steps of preliminary heating said ore to a temperature of at least 75° C. to reduce said pentasulfide to trisulfide and sulfur and removing said sulfur from said ore.

9. The process of claim 1, further including the step of adding water to said filtrate prior to allowing same to settle to accelerate hydration of said antimony trioxide trihydrate: said water added and that formed in the reaction amounting to no more than 26.52% of the antimony trisulfide content of said concentrate.

10. The process of claim 1, wherein said ore is treated with said lower alkanol solution of hydroxide at a temperature of about 50° C.

11. The process of claim 1, wherein said concentrate contains more than two percent of antimony sulfide and further including the step of adding from 5 to 50 percent by weight of $CS_2$ to said lower alkanol solution.

12. The process of claim 1, wherein said alkanol solution of hydroxide has a concentration of 8 to 33 percent w/v of hydroxide.

13. The process of claim 1, further including the step of adding water to said filtrate to form a water solution of sulfides immiscible with said alkanol, and separating said solution from said alkanol.

* * * * *